United States Patent Office 3,819,729
Patented June 25, 1974

3,819,729
PROCESS FOR PRODUCING 1-CHLORO-1-FLUOROETHYLENE
Chiyuki Fujii, Yamoto, Tsutomu Sinike, Hirakata, and Yoshiharu Inoue, Tokyo, Japan, assignors to Denki Kagaku Kogyo K.K., Tokyo, Japan
No Drawing. Filed Aug. 2, 1971, Ser. No. 168,408
Claims priority, application Japan, Aug. 21, 1970, 45/73,292
Int. Cl. C07c 17/00, 21/18
U.S. Cl. 260—653.3         4 Claims

ABSTRACT OF THE DISCLOSURE 1-chloro-1-fluoroethylene is produced by dehydrogenating 1-chloro-1-fluoroethane by vapor phase thermal decomposition with chlorine at a temperature of from 300°–700° C.

BACKGROUND OF THE INVENTION

Field of Invention

This invention relates to a process for producing 1-chloro-1-fluoroethylene by use of 1-chloro-1-fluoroethane and chlorine as reactants.

Description of Prior Art

It is known to produce 1-chloro-1-fluoroethylene by the following processes:

(1) dehalogenation of 1,1-dichloro-1-fluoro-2-bromoethane with zinc dust.

(2) dehydrochlorination by thermal decomposition of 1,1-dichloro-1-fluoroethane.

However, in order to obtain the halogenated hydrocarbon materials used as reactants in those processes, at least 2 additional reaction steps are required, so that the yield of starting material is quite low. Moreover, those conventional techniques require the use of expensive fluorine-resistant equipment and both the reaction procedures and the equipment used are rather complex. Accordingly, in order to decrease the reaction steps, a different type of starting material has been required. It would be desirable, therefore, to be able to provide a technique for providing 1-chloro-1-fluoroethylene, which is less costly and complex than the prior art techniques and which uses a more economical starting material.

SUMMARY OF THE INVENTION

Accordingly, it is one object of this invention to provide a process for producing 1-chloro-1-fluoroethylene which uses relatively economical reactants as compared with prior art techniques and which does not require 2 additional reaction steps to obtain the primary reactants.

These and other objects have now herein been attained by providing a process for producing 1-chloro-1-fluoroethylene whereby 1-chloro-1-fluoroethane is thermally decomposed in the vapor phase with chlorine.

DETAILED DESCRIPTION OF PREFERRED EMBODIMENTS

The primary reactant for this reaction is 1-chloro-1-fluoroethane, which can be produced in high yields by reacting hydrofluoric acid with vinyl chloride in a one-step reaction.

In the process of this invention, 1-chloro-1-fluoroethylene is produced in high yields of 50–60%, by the vapor phase, thermal decomposition, dehydrogenation, by passing 1-chloro-1-fluoroethane with chlorine through a reaction tube in vapor state.

Vinyl fluoride, vinylidene fluoride, and vinyl chloride are produced as byproducts of the reaction. However, the extent of such byproduct production can be decreased by controlling the reaction residence period. Moreover, the formation of a vinyl chloride byproduct can be effectively controlled by passing hydrogen fluoride into the reaction system.

In carrying out this reaction, the reaction temperature is preferably in the range of 300°–700° C. If the reaction temperature is too low, the rate of reaction will be too low, and if the reaction temperature is too high, the extent of byproduct formation will be undesirably increased. The molar ratio of 1-chloro-1-fluoroethane to chlorine is not limited, but is preferably in a range of 1:1–10. The contact period for reaction is preferably 0.1–30 seconds. The pressure in the reaction can be in a range of atmospheric pressure—10 atm.

Having generally described the invention, a further understanding can be obtained by reference to certain Examples which are provided herein for purposes of illustration only and are not intended to be limiting in any manner.

Example 1

In a reaction tube (½" in diameter and 1 meter in length) which is made of JIS-SUS 32 material, and maintained at 500° C., 1-chloro-1-fluoroethane was fed at the rate of 1 mole per hour and chlorine was fed at the rate of 2 moles/hour under atmospheric pressure. As a result, 1-chloro-1-fluoroethylene was obtained in a yield of 20%, and vinyl chloride was obtained as a byproduct at a yield of 70%.

Example 2

The process of Example 1 was repeated, except that the reaction pressure was 5 atm. and the reaction temperature was 550° C. As a result, 1-chloro-1-fluoroethylene was obtained in a yield of 40%.

Example 3

The process of Example 1 was repeated, except chlorine was fed at the rate of 1 mole per hour and anhydrous hydrofluoric acid for decreasing byproduct formation was fed at the rate of 1 mole per hour. As a result, 1-chloro-1-fluoroethylene was obtained in a yield of 40%.

Example 4

In the reaction tube stated in Example 1, 1-chloro-1-fluoroethane was fed at the rate of 2 moles per hour and chlorine was fed at the rate of 4 moles per hour and anhydrous hydrofluoric acid was fed at the rate of 4 moles per hour at a reaction temperature of 650° C. As a result, 1-chloro-1-fluoroethylene was obtained at a yield of 65%.

Example 5

In the reaction tube stated in Example 1, 1-chloro-1-fluoroethane was fed at the rate of 1 mole per hour, and chlorine was fed at the rate of 2 moles per hour, and anhydrous hydrofluoric acid was fed at the rate of 1 mole per hour at a reaction temperature of 500° C. under a total pressure of 5 atm. As a result, 1-chloro-1-fluoroethylene was obtained at a yield of 55%.

Example 6

In a reaction tube made of nickel (½" in diameter and 60 cm. in length), 1-chloro-1-fluoroethane was fed at the rate of 0.3 mole per hour, chlorine was fed at the rate of 2 moles per hour at 400° C. As a result, 1-chloro-1-fluoroethylene was obtained at a conversion of 100% and at a selectivity of 70.5%. Vinyl fluoride was obtained as a byproduct at a selectivity of 21%.

Example 7

In the reaction tube made of nickel stated in Example 6, 1-chloro-1-fluoroethane was fed at the rate of 0.3 mole per hour, and chlorine was fed at the rate of 0.7 mole per hour, at a reaction temperature of 400° C. As a result, 1-chloro-1-fluoroethylene was obtained at a conversion of 98.1%, and at a selectivity of 64%. Vinyl fluoride was obtained as a byproduct at a selectivity of 26%.

Having now fully described the invention, it will be apparent to one of ordinary skill in the art that many changes and modifications can be made thereto without departing from the spirit or scope of the invention. Accordingly,

What is claimed as new and intended to be secured by Letters Patent of the United States is:

1. A process for producing 1-chloro-1-fluoroethylene, which comprises:
dehydrogenating 1-chloro-1-fluoroethane by a vapor phase thermal decomposition reaction of 1-chloro-1-fluoroethane with chlorine at a mole ratio of 1-chloro-1-fluoroethane to chlorine of 1:1–10 at 300°–700° C. wherein said reaction is conducted in the presence of continuously passed anhydrous hydrofluoric acid in amounts which effectively control the formation of vinylchloride by-product.

2. The process for producing 1-chloro-1-fluoroethylene according to Claim 1, wherein the molar ratio of 1-chloro-1-fluoroethane to chlorine is in a range of 1:1–10.

3. The process for producing 1-chloro-1-fluoroethylene according to Claim 1, wherein the residence period for said reaction is in a range of 0.1–30 seconds.

4. The process for producing 1-chloro-1-fluoroethylene according to Claim 1, wherein the total pressure in said reaction is in a range of atmospheric pressure to 10 atm.

References Cited
UNITED STATES PATENTS

| | | | |
|---|---|---|---|
| 2,723,296 | 11/1955 | Litant et al. | 260—653.3 |
| 2,722,558 | 11/1955 | Johnson | 260—653.3 |

DANIEL D. HORWITZ, Primary Examiner

U.S. Cl. X.R.
260—656 R, 653.5